United States Patent
Nejatian (10) Patent No.: US 8,144,634 B2
(45) Date of Patent: Mar. 27, 2012

(54) REDUCING AUTOMATIC GAIN CONTROL PROCESS IN TIME DIVISION DUPLEX COMMUNICATION MODE

(75) Inventor: Alireza Nejatian, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 920 days.

(21) Appl. No.: 11/948,009

(22) Filed: Nov. 30, 2007

(65) Prior Publication Data

US 2008/0198775 A1    Aug. 21, 2008

Related U.S. Application Data

(60) Provisional application No. 60/902,354, filed on Feb. 21, 2007.

(51) Int. Cl.
*H04J 3/00* (2006.01)

(52) U.S. Cl. ........ 370/280; 370/294; 370/345; 375/345; 455/136; 455/138; 455/232.1

(58) Field of Classification Search .................. 370/328, 370/345, 342, 280, 330, 294; 455/232.1, 455/562.1, 522, 136, 138, 127.2; 375/345
See application file for complete search history.

(56) References Cited

U.S. PATENT DOCUMENTS

| | | | |
|---|---|---|---|
| 6,094,585 A * | 7/2000 | Dajer et al. | 455/522 |
| 6,563,891 B1 * | 5/2003 | Eriksson et al. | 375/345 |
| 6,842,438 B1 * | 1/2005 | Benedict et al. | 370/328 |
| 6,873,832 B2 * | 3/2005 | Shi | 455/232.1 |
| 7,068,637 B2 * | 6/2006 | Saito et al. | 370/342 |
| 7,860,058 B2 * | 12/2010 | Suo et al. | 370/330 |
| 2002/0061005 A1 * | 5/2002 | Lee et al. | 370/342 |
| 2004/0022228 A1 | 2/2004 | Tyra et al. | |
| 2006/0034401 A1 * | 2/2006 | Cho et al. | 375/345 |
| 2007/0099670 A1 * | 5/2007 | Naguib et al. | 455/562.1 |
| 2007/0254610 A1 | 11/2007 | Levy | |
| 2008/0014889 A1 * | 1/2008 | Homer et al. | 455/232.1 |
| 2008/0056413 A1 | 3/2008 | Demir et al. | |

FOREIGN PATENT DOCUMENTS

| | | |
|---|---|---|
| EP | 1 168 690 A2 | 1/2002 |
| WO | 00/31867 | 6/2000 |
| WO | 03/077356 A2 | 9/2003 |

OTHER PUBLICATIONS

International Preliminary Report on Patentability dated Apr. 9, 2009 (7 pages).
3GPP TS 36.211 V1.2.0, "3rd Generation Partnership Project; Technical Specification Group Radio Access Network; Physical Channels and Modulation (Release 8)," Valbonne, France, Jun. 2007, pp. 1-43.

* cited by examiner

*Primary Examiner* — Aung S Moe
*Assistant Examiner* — Vincelas Louis
(74) *Attorney, Agent, or Firm* — Nixon & Vanderhye P.C.

(57) ABSTRACT

In TDD mobile networks, an incoming signal is received during a time period where no uplink communication takes place. The incoming signal is measured and analyzed to determine a noise level. Based on the noise level and on an uplink signal level from expected in a future uplink time slot, a gain for the automatic gain controller is set for use in future uplink communications. The gain is set to optimize the operation of an analog-to-digital converter.

29 Claims, 10 Drawing Sheets

CONVENTIONAL ART

RADIO FRAME TYPE 1

Fig. 3

CONVENTIONAL ART

RADIO FRAME TYPE 2

Fig. 16

REDUCING AUTOMATIC GAIN CONTROL PROCESS IN TIME DIVISION DUPLEX COMMUNICATION MODE

RELATED APPLICATION

This application is related to U.S. provisional patent application 60/902,354 entitled "Reducing Automatic Gain Control Process Time in TDD", filed Feb. 21, 2007, which is incorporated herein by reference in its entirety.

TECHNICAL FIELD

The technical field of this disclosure generally relates to reducing delays in setting a gain for automatic gain control process in mobile broadband networks. More specifically, the disclosure relates to methods and apparatuses to reduce a reaction time to set a proper gain for automatic gain control in a mobile broadband network operating in a time division duplex mode.

BACKGROUND

Figure 1:
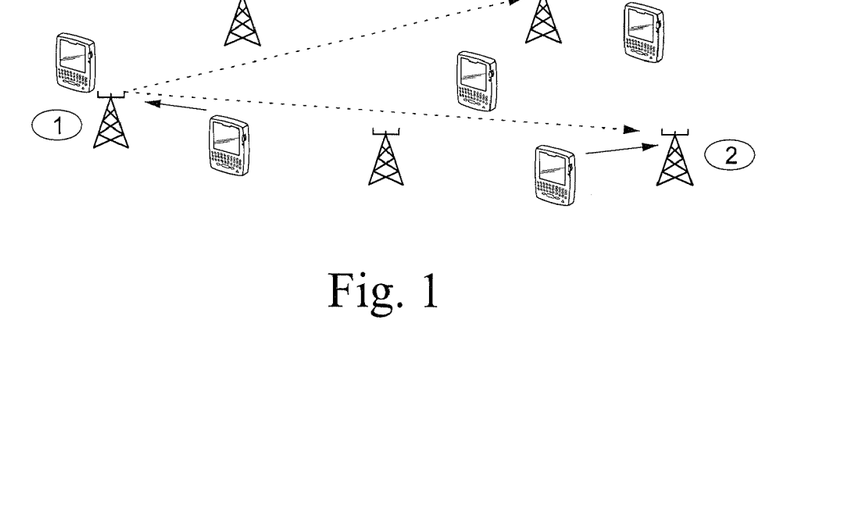
FIG. 1 illustrates an example scenario in which base stations and mobile terminals interferes—generates noise—to other base stations and mobile terminals.

WCDMA (Wideband Code Division Multiple Access) provides communications capability in both a FDD (Frequency Division Duplex) mode and a TDD (Time Division Duplex) mode. In the TDD mode, system capacity is maximized when the base stations (Node Bs) in a UTRA (UMTS Terrestrial Radio Access) TDD mode deployment area operate synchronously. But this may not be the case, and there are other possible deployment scenarios in areas used for mobile communications. Multi-operator, single operator, unsynchronized network, synchronized network with asymmetry on the DL/UL (downlink/uplink) and other access technology are often used in the same area. In systems where different access technologies are used, base stations and mobile terminals generate considerable noise to other radio nodes and systems as illustrated in FIG. 1.

Figure 2:
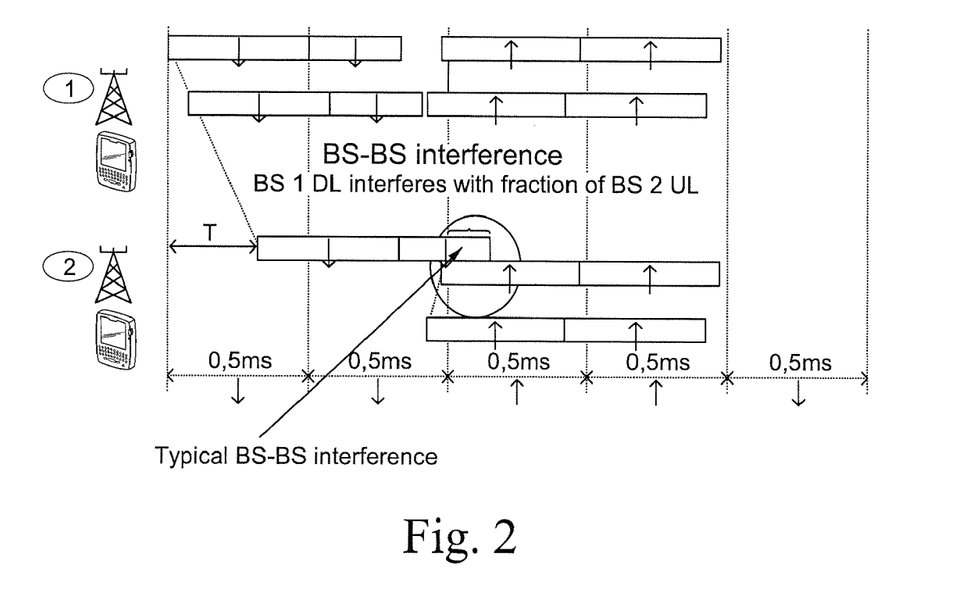
FIG. 2 illustrates an example scenario in which a base station of a network generates noise for another base station.

Due to non-zero time phenomena, even a synchronized network generates unwanted noise to other base stations within its own system due to DL propagation time over a distance as illustrated in FIG. 2. In FIG. 2, a communications network includes base stations BS 1 and BS 2. In this network, the BS 1's DL (signal transmission from the base station to the mobile terminal) communication interferes with a portion of the BS 2's UL (signal transmission from the mobile terminal to the base station) communication.

The noise exists in both the FDD and TDD modes. In the FDD mode, different frequency bands are used for UL and DL allowing both the UL and DL to operate continually. When the UL communications from the mobile terminals are continual, then the system knows approximately the total power of the signals, wanted and unwanted, received by the base station.

In the TDD mode, the same frequency band is used for both UL and DL communications. That is, the DL and UL communications are separated by time slots instead of frequency bands in the TDD mode. It is not unusual to have asymmetry in DL/UL traffic time in a TDD system. That is a majority of the time slots can be devoted to DL communication and a minority of time slots can be devoted to UL communication or vice versa.

Automatic gain control (or simply "gain control") is an important function in mobile communication systems. The purpose of the automatic gain control is to reduce or attenuate a strong interferer, blocker, or other noise that comes to the system. One gain control function is to dynamically adjust the gain of the incoming signals during receiving so that saturation is prevented or minimized. The incoming signal into the base station's Rx includes a desired signal and the noise signal. The gain control should find a balance of signal level (power level) in the Rx chain so that an analog-to-digital converter (ADC) in the Rx chain works near its maximum input level, without going to saturation. This maximizes the dynamic range of the system.

In existing FDD systems, AGC process may take about 2-3 ms. As described in the document "3GPP TS 36.211 V1.2.0" from the $3^{rd}$ Generation Partnership Project, both DL and UL communications are organized into radio frames each with a 10 ms duration. Two types of radio frame structures are supported. Type 1 is applicable to both FDD and TDD and type 2 is applicable to TDD only.

Figure 3:
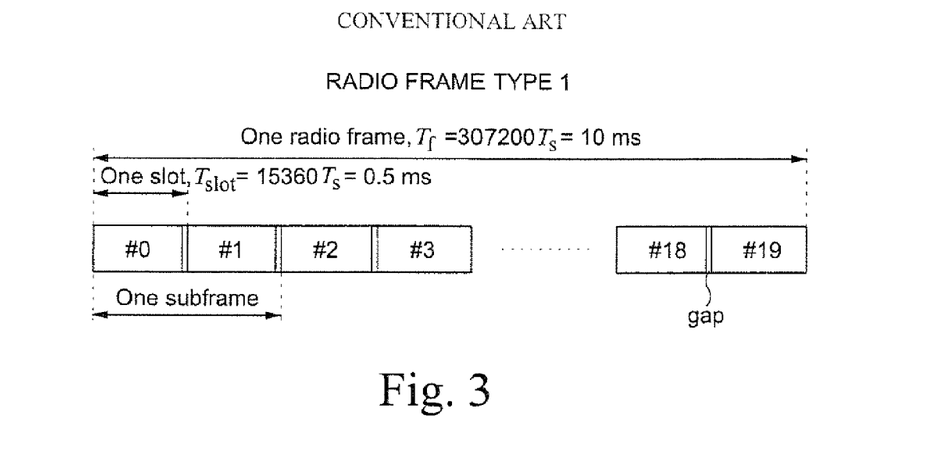
FIG. 3 illustrates a structure of a type 1 radio frame.

In type 1 TDD systems illustrated in FIG. 3, each radio frame is divided into to 20 time slots (numbered 0-19) with each time slot being 0.5 ms in duration. A subframe consists of two consecutive time slots such as time slots 0 and 1. Thus, each subframe is 1 ms long. Each subframe is allocated to be used for either the UL or DL communication with the exception of subframe 0 (time slots 0 and 1) and subframe 5 (time slots 10 and 11) which are reserved for DL.

Figure 4:
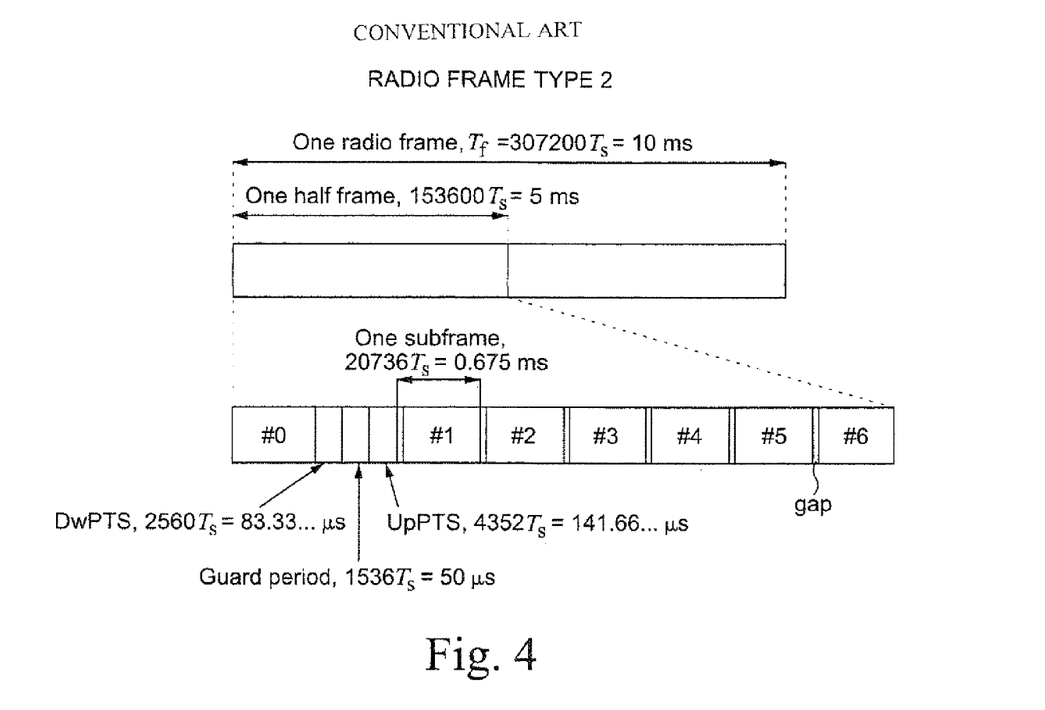
FIG. 4 illustrates a structure of a type 2 radio frame.

In type 2 systems illustrated in FIG. 4, each radio frame is divided into two half-frames of 5 ms each. Each half-frame includes 7 times slots (numbered 0-6), each of which are 0.675 ms long in duration. Each half-frame also includes three special fields—DwPTS (Downlink Pilot Time Slot), GP (guard period) and UpPTS (Uplink Pilot Time Slot)—between time slots 0 and 1. In each time slot, the communication can be either UL or DL. However, time slot 0 and DwPTS are reserved for DL and UpPTS and time slot 1 are reserved for UL.

In the TDD systems, a particular amount of time (1.0 ms for type 1 and 0.675 ms for type 2) is allocated for UL communication. But as noted above, the reaction time of the gain control in existing FDD systems is on the order of 2-3 ms. This means that for the TDD systems, the existing gain control cannot react fast enough to control the gain during any one allocated subframe or time slot in which the UL communication takes place.

SUMMARY

For controlling a gain of an automatic gain control apparatus operating in a time division duplex mode, the following can be considered. An incoming signal received at a base station during a non-uplink time period is measured. The non-uplink period is a time period in which no mobile terminal is allowed to provide uplink communication. An example of the non-uplink period is a downlink period such as a DwPTS period in which no uplink communication is allowed (part of this period can be used for measurement). Another example is a gap period in between time slots in which neither uplink nor downlink communication takes place.

A noise level is determined based on the incoming signal to the receiver (Rx). Power level of the incoming signal can be considered to include outside noise and base station added noise. Any contribution to the noise from the base station is factored out to determine the noise level. To calculate base station's noise contributions to the total noise, the incoming signal is measured after a predetermined amount of time during Tx power off state. If the Tx power off state or gap period between DL/UL is long enough, a quiescent time may be allowed to pass so that the base station's noise contribution can be ignored.

Based on the noise level, a gain for an automatic gain controller is set for use in future uplink time slots to provide communications from one or more mobile terminals to the base station. The gain is set such that a gained signal provided is in a linear operating range of a receive chain, and preferably at a highest point of the linear operating range.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

For the purposes of explanation, some of the principles will be explained with reference to type 2 systems. The principles are applicable to type 1 systems as well. As illustrated in FIG. 4, each half-frame of the radio frame includes time slots 0-6 and three special fields—DwPTS, GP and UpPTS—between time slots 0 and 1. In each time slot, the communication can be either UL or DL. However, time slot 0 and DwPTS are reserved for DL and UpPTS and time slot 1 are reserved for UL. During the GP, no communications take place. Also between time slots, there may be a gap period in which no DL nor UL communication takes place which is used for DL/UL switching. The gap period can represent a transition between DL and UL communications.

Two types of information are necessary to control the signal level inputted into the ADC. First is the information on the power level of the desired signal from the mobile terminals. For both FDD and TDD systems, the desired signal level can be readily determined. The base station is aware of the mobile terminals that are in communications with the base station. The base station is also aware of the transmitting power of the mobile terminals. This allows the base station to reasonably accurately determine the power level of the desired signal.

The other information is the power level of the noise—i.e., the noise level—also referred to as "vagrant" noise. In FDD systems, since the UL communication takes place continually, the noise level can be readily determined by measuring and analyzing the signals received by the base station. Once the noise level is determined, the gain of the AGC can be controlled appropriately for UL communications.

For TDD systems, the existing AGC cannot react fast enough to control the gain during any one allocated time period. One solution to this problem is to provide information regarding the unwanted noise to the system in advance of the UL communication taking place. This allows the AGC to find and set an optimal working point for the ADC when the UL communication actually takes place.

Figure 5:
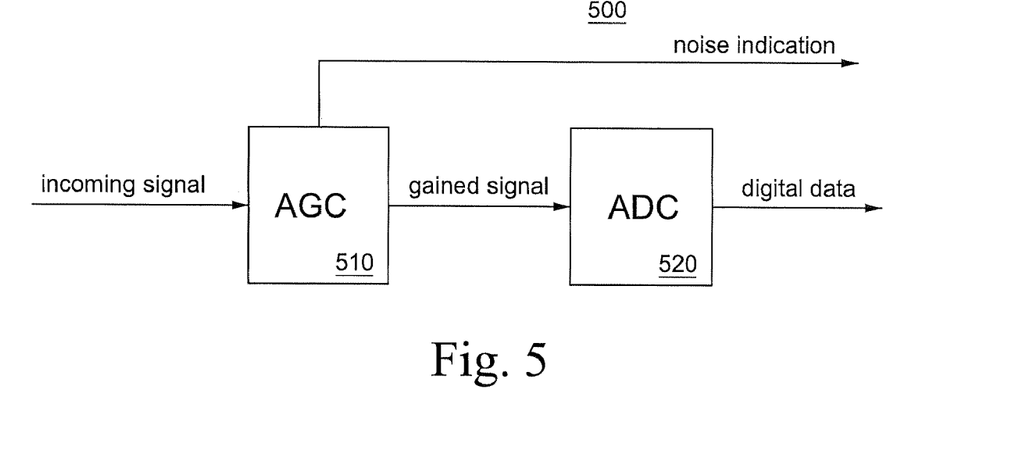
FIG. 5 illustrates an example embodiment of a gain control apparatus.
Figure 6:
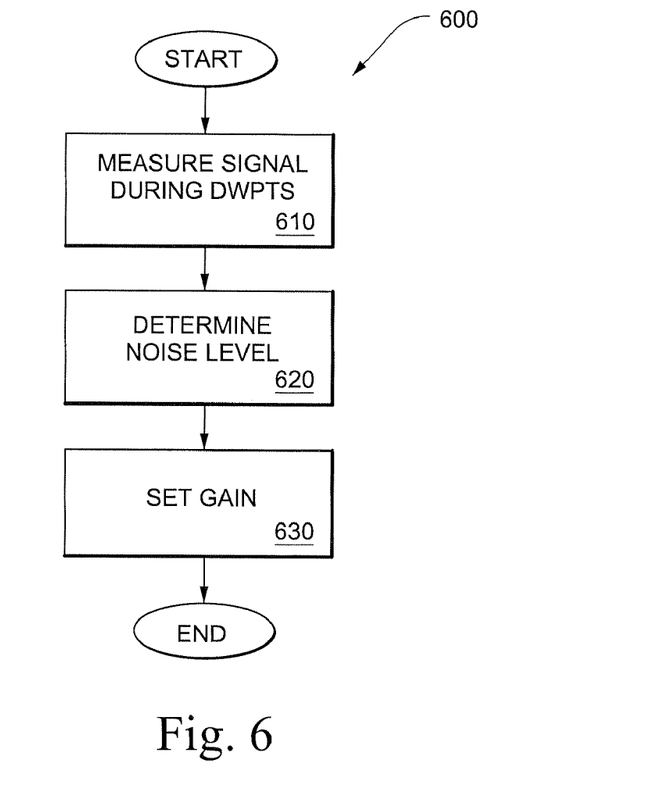
FIG. 6 illustrates an example method control a gain when operating in a TDD mode in which an incoming signal is measured during a downlink allocated time period.

An implementation of the solution is illustrated in FIGS. 5 and 6. FIG. 5 illustrates an example gain control apparatus 500 and FIG. 6 illustrates and example method 600 performed by the gain control apparatus 500 to control the gain in a TDD system. The apparatus 500 includes an automatic gain controller (AGC) 510 configured to receive an incoming signal. Based on the characteristics of the incoming signal, the AGC 510 sets the appropriate gain/attenuation for the incoming signal and outputs a gained/attenuated signal to the analog-to-digital converter (ADC) 520. The ADC 520 is configured to convert the gained signal and output digital data.

In FIG. 6, the method 600 begins by measuring the signal received, at a base station for example, during DwPTS (act 610). Based on this measurement, the noise level is determined (act 620). Based on the noise level and an uplink signal level expected in a future uplink time slot, the gain of the AGC is set (act 630).

In one embodiment, the level of the signal received at the base station is determined to be the noise level in act 620. The explanation is as follows. The DwPTS period is reserved for DL which indicates that the mobile terminals that are served by the base station should not be transmitting any signals during this time. Thus, any signal received by the base station during this period should be mostly noise.

Figure 7:
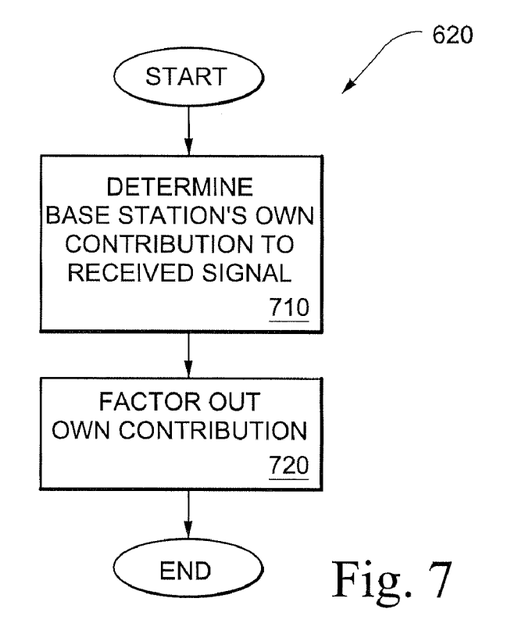
FIG. 7 illustrates an example method to determine a noise level of an incoming signal in which the base station's contribution is taken into account.

In another embodiment, a contribution to the signal received at the base station from the base station itself is considered in determining the noise level as illustrated in FIG. 7. FIG. 7 shows basic, representative acts of an example method to implement the act 620 of determining the noise level. The method includes determining the base station's own contribution to the total power of the incoming signal measured at the base station (act 710). The noise level is determined by factoring out the base station's contribution (act 720).

For instance, if the base station is actually transmitting during this time, the power level of the transmitted signal should be factored out. If the transmitter and the receiver are physically separated, some attenuation may occur. In this situation, the attenuated power would be factored out of the total power level received at the receiver.

However, measuring while the base station is transmitting may not be practical in most instances even if the transmitter and the receiver are physically separated. This separation is usually much smaller compared to distances between the base station and mobile terminals being served by the base station. In this situation, the base station's own contribution would likely overwhelm the noise, which makes noise level determination less accurate.

Figure 8:
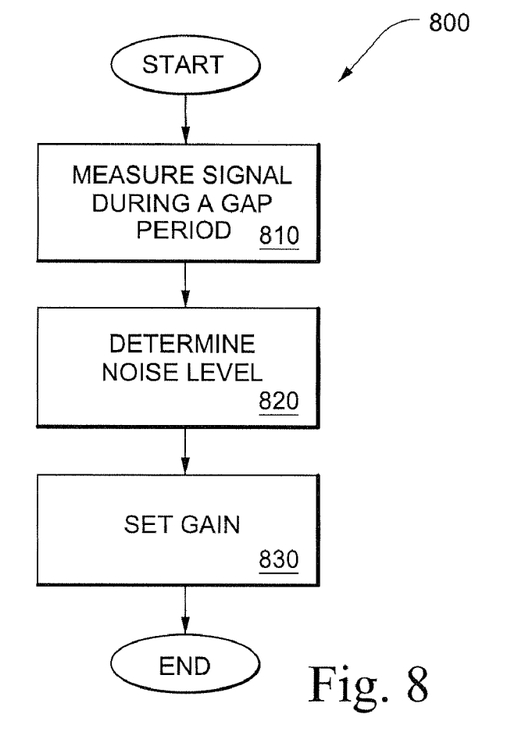
FIG. 8 illustrates another example method control the gain when operating in the TDD mode in which an incoming signal is measured during a time period in which no downlink and uplink communication takes place.

Thus, in an example embodiment, the signal at the base station is measured during a time period in which neither DL nor UL communication is taking place, i.e., a time period in which neither the base station nor the mobile terminals are transmitting. This is illustrated in FIG. 8 which is an example method 800 performed by the gain control apparatus 500 to control the gain applicable to both type 1 and in type 2 TDD systems. In FIG. 8, the method 800 begins by measuring the incoming signal, at the base station for example, during a gap period (act 810) in which no UL and DL communication is taking place. Based on this measurement, the noise level is determined (act 820). Based on the noise level, the gain of the AGC is set (act 830).

In type 1 TDD systems, the gap period is in between any two time slots. In type 2 systems, the gap period is also present to separate the time slots. In addition, there is a special gap period in type 2—the guard period (GP) between the DwPTS and the UpPTS periods. These gap periods (including the GP period) are potential switching points in which the direction of the communication from UL switches to DL or vice versa. To minimize the number of measurements and calculations to set the gain, the actual measurement can be made during the gap period in which the switch actually occurs, i.e., the measurement need not take place during every gap period. In particular, the GP period in type 2 systems can be used since the switch definitely occurs between the DwPTS and the UpPTS periods.

Because neither the base station nor the mobile terminals are transmitting during the gap period, the measured incoming signal should be mostly noise. Thus, in one embodiment, the level of the signal received at the base station during the gap period is determined to be the noise level in act 820.

Even though the base station is not transmitting during the gap period, the base station may still contribute to the signal received. This is explained with reference to FIG. 9 which illustrates a signal decay over time during TX off state. Assume that the base station is transmitting at power level $P_M$ just prior to discontinuing the transmission. When the transmission discontinues at time T=0, the transmission level does not immediately drop to zero. Instead, the signal decays over time and the decay is predictable to a reasonably accurate degree. More specifically, the rate of decay is high at the beginning and slows as time passes in an inverse exponential manner.

Figure 9:
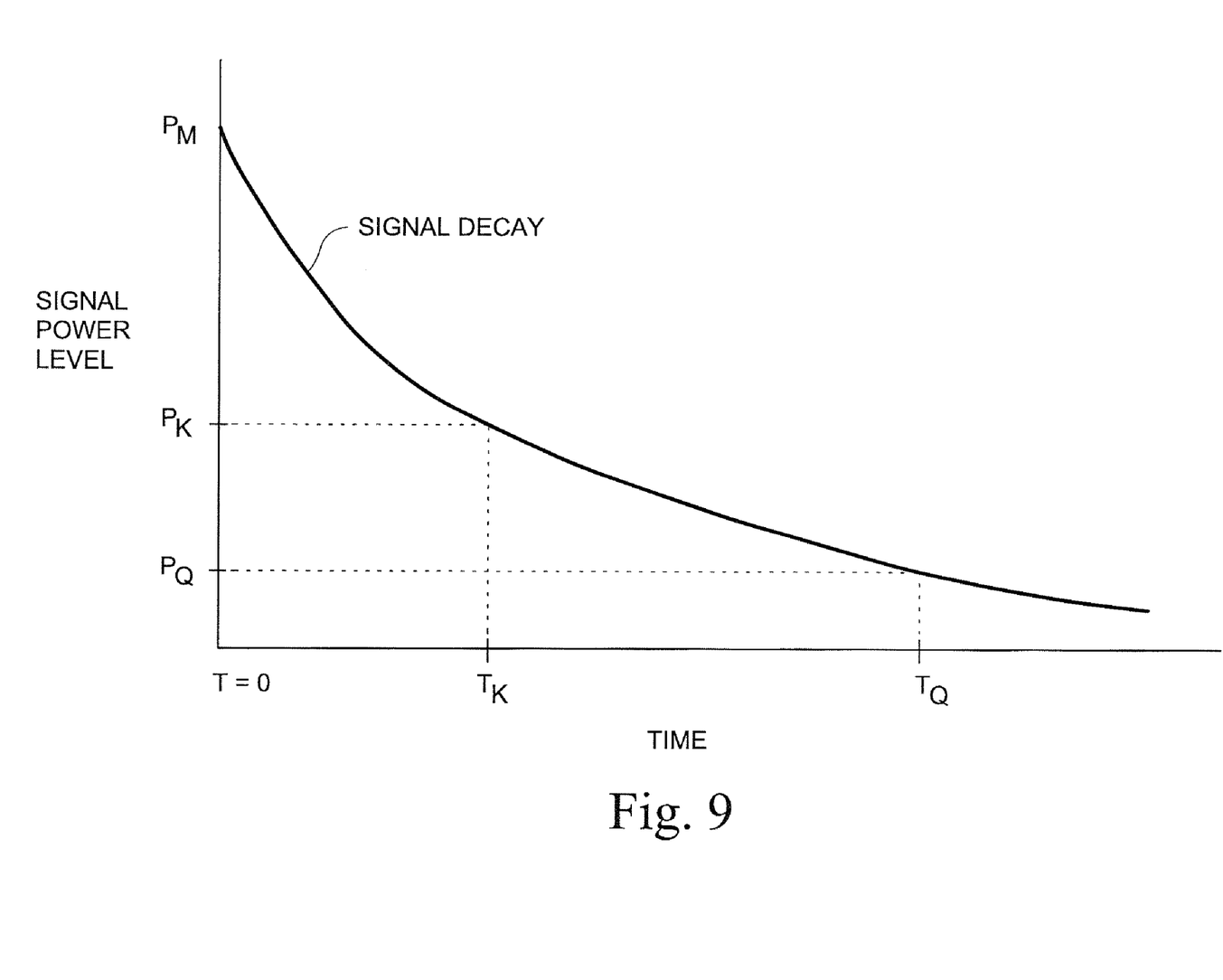
FIG. 9 illustrates an example of Tx signal decay over time in TX power off state.

When some time passes after the base station transmission is discontinued, i.e., at time $T=T_Q$, the transmitted power reaches a quiescence level $P=P_Q$, which can be a level low enough such that the base station's contribution can be ignored without sacrificing much accuracy.

Figure 10:
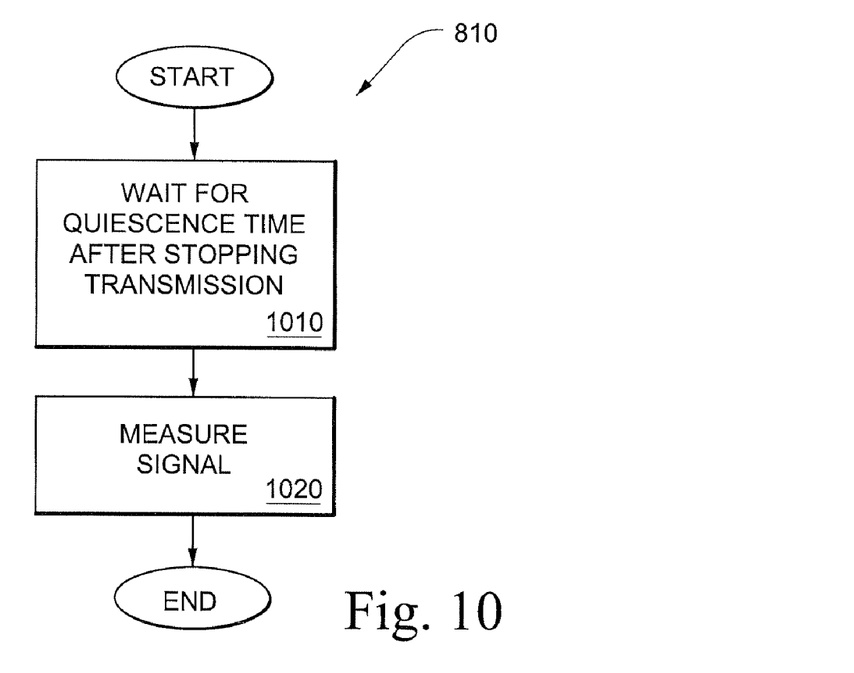
FIG. 10 illustrates an example method to measure the incoming signal when the base station's contribution reaches quiescence.

Thus, in an embodiment, a method is presented in which the transmission power is allowed to reach the quiescence level $P_Q$ before the measurement takes place. In FIG. 10, which illustrates an example method to implement the act 810. In this method, after the base station stops transmitting, an amount of time sufficient for the transmitted power to reach quiescence is waited (act 1010). Then the signal at the base station is measured (1020) at time $T_Q$. The quiescence level $P_Q$ may not be zero. But if $P_Q$ is negligible, then it may be ignored and the measured signal level may be taken as the noise level.

Waiting for quiescence time presupposes that the gap period is long enough so that the measurement time $T_Q$ falls within the gap period. When this occurs, determining the noise level is simplified since the measured level can be taken as the noise level in act 820. In type 2 systems, the GP period is comparatively longer than other gap periods. Accordingly, the GP period is preferred to provide a good chance for the base station's transmission to reach the quiescence level.

Depending on the characteristics of the system, the gap period may not be long enough to allow the transmitted power to reach quiescence. When the gap period is not long enough, the base station's own contribution may not be negligible, and thus should be taken into account. As noted previously, the decay of the base station's transmission is predictable. This predictability allows the base station's own contribution $P_K$ at any particular moment in time $P_K$ to be determined to a reasonably accurate degree. The calculated contribution level $P_K$ then can be factored out of the total signal level $P_T$ leaving an accurate measurement of the noise level $P_N$. Mathematically, the noise level may be determined as $P_N = P_T - P_K$.

Figure 11:
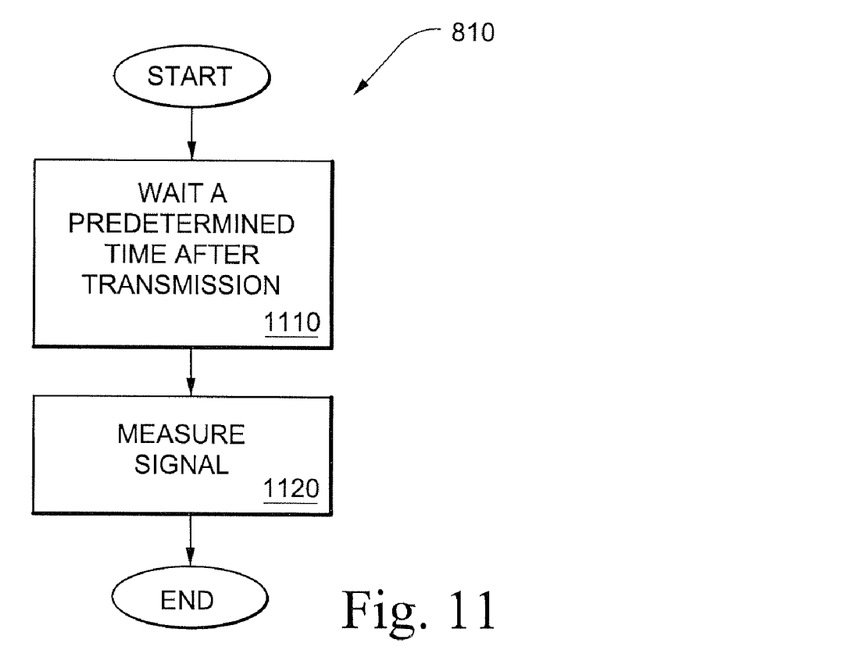
FIG. 11 illustrates another example method to measure the incoming signal after waiting a predetermined amount of time after the base station stops transmitting.

FIG. 11 illustrates an example method to determine and factor out base station's own contribution to implement the act 810. This method begins by waiting for a measuring time $T=T_K$ to arrive after the base station discontinues transmission (act 1110). When $T_K$ arrives, the incoming signal at the base station is measured (1120). Note that FIG. 11 is a generalized version of FIG. 10 in which the quiescent time $T_Q$ is the measuring time $T_K$ in which the base station's contribution $P_K$ is determined to be negligible, i.e., $P_K = P_Q \approx 0$.

Figure 12:
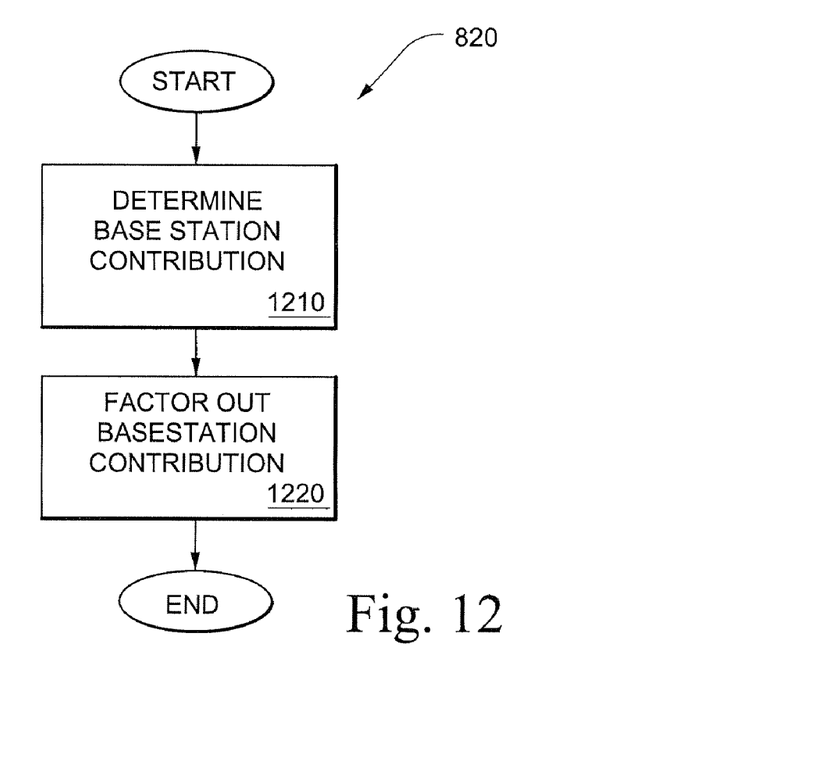
FIG. 12 illustrates another example method to the noise level of the incoming signal in which the base station's contribution is taken into account.

Complementing the embodiment illustrated in FIG. 11, FIG. 12 illustrates a method to implement the act 820 of determining the noise level. In this method, the base station's own contribution $P_K$ to the total power $P_T$ of the incoming signal measured at time $T_K$ at the base station is determined (act 1210). The noise level $P_N$ is determined by factoring out the base station's contribution $P_K$ from the measured level $P_T$ (act 1220).

The time $T_K$ should fall within the gap period. Also, it is preferred that duration between when the base station's transmission is stopped (transmit stop time $T=T_O$) and the measuring time $T_K$ be as long as possible to allow the signal to decay as much as possible. In other words $T_K - T_O = T_K$ (assuming $T_O$ is taken to be zero) should be maximized. This reduces the likelihood that the base station's contribution $P_K$ will overwhelm the noise level $P_N$, which in turn enhances the accuracy of the system.

Once the noise level $P_N$ is determined, then the appropriate gain can be set in act 830 (also act 630) for the uplink signals expected to be provided to the ADC during future UL time slots. The gain should be such that an appropriate balance of the signal level in the Rx chain so that the ADC works near its maximum input level, without saturation. This is explained with reference to FIG. 13, which illustrates an operation sensitivity of the receive chain. It is seen when the input level is below $I_1$ or above $I_2$, the output varies very little with the input, i.e., the output is not sensitive to the input variance. In between levels $I_1$ and $I_2$, the output does vary with the input, and the variance is substantially linear.

Figure 13:
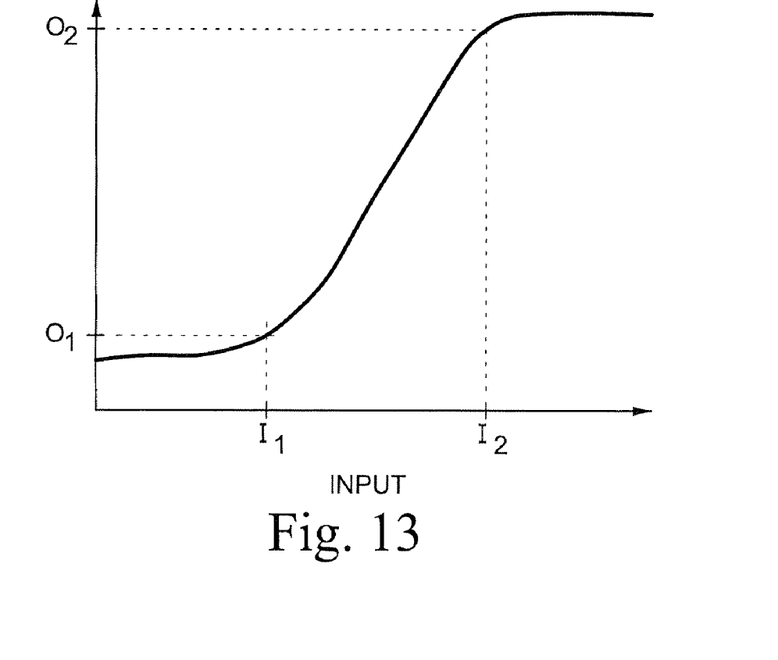
FIG. 13 illustrates an operation sensitivity of an example receive chain of an automatic gain control apparatus.

Thus, in one implementation, the gain is set such that a level of the signal provided from the AGC to the ADC falls between $I_1$ and $I_2$. For example, in the gain control apparatus 500 illustrated in FIG. 5, the gain is set for the future incoming signal provided to the AGC 510 such that the strength of the gained signal provided to the ADC is in the linear range.

Figure 14:
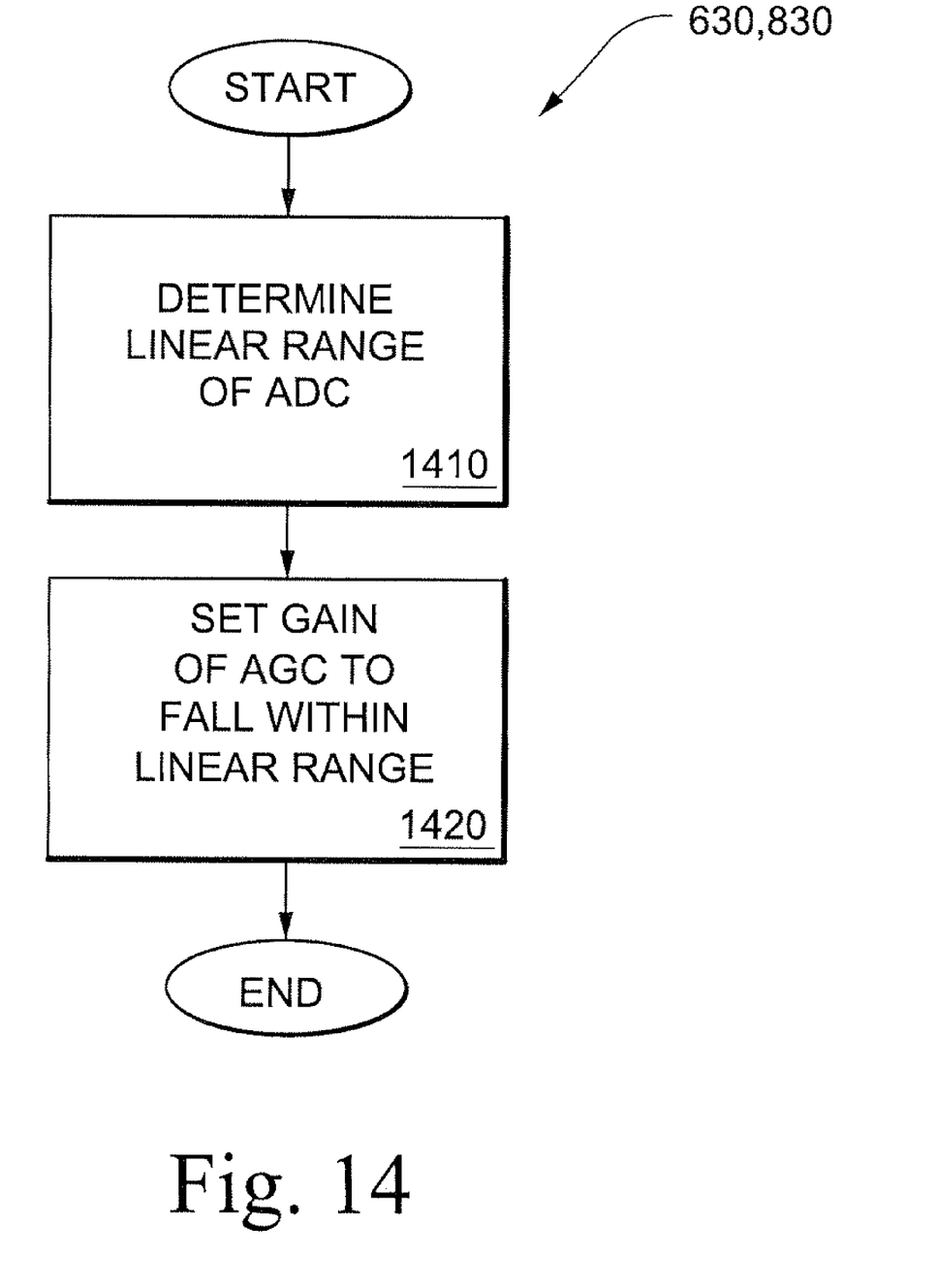
FIG. 14 illustrates an example method to set a gain of an automatic gain controller.

FIG. 14 illustrates an example method to implement the acts 630, 830 (FIGS. 600, 800) such that the gained signal falls within the appropriate range. In FIG. 14, the linear operating range of the ADC is determined (act 1410). Based on the linear operating range, the gain of the AGC is set so that the gained signal provided to the ADC falls within the linear range (act 1420).

In setting the gain as noted above, the information on the power level of the desired signals (expected uplink signals) from the mobile terminals are taken into account. Also as noted above, the base station is aware of the transmitting power of the mobile terminals, which allows the base station to determine the power level of the expected uplink signals. In particular, it is preferred that the gain be set such that the gained signal provided to the ADC be as close to $I_2$ as possible, which is the highest point of the linear range. This is where the sensitivity of the ADC is greatest without reaching saturation.

Figure 15:
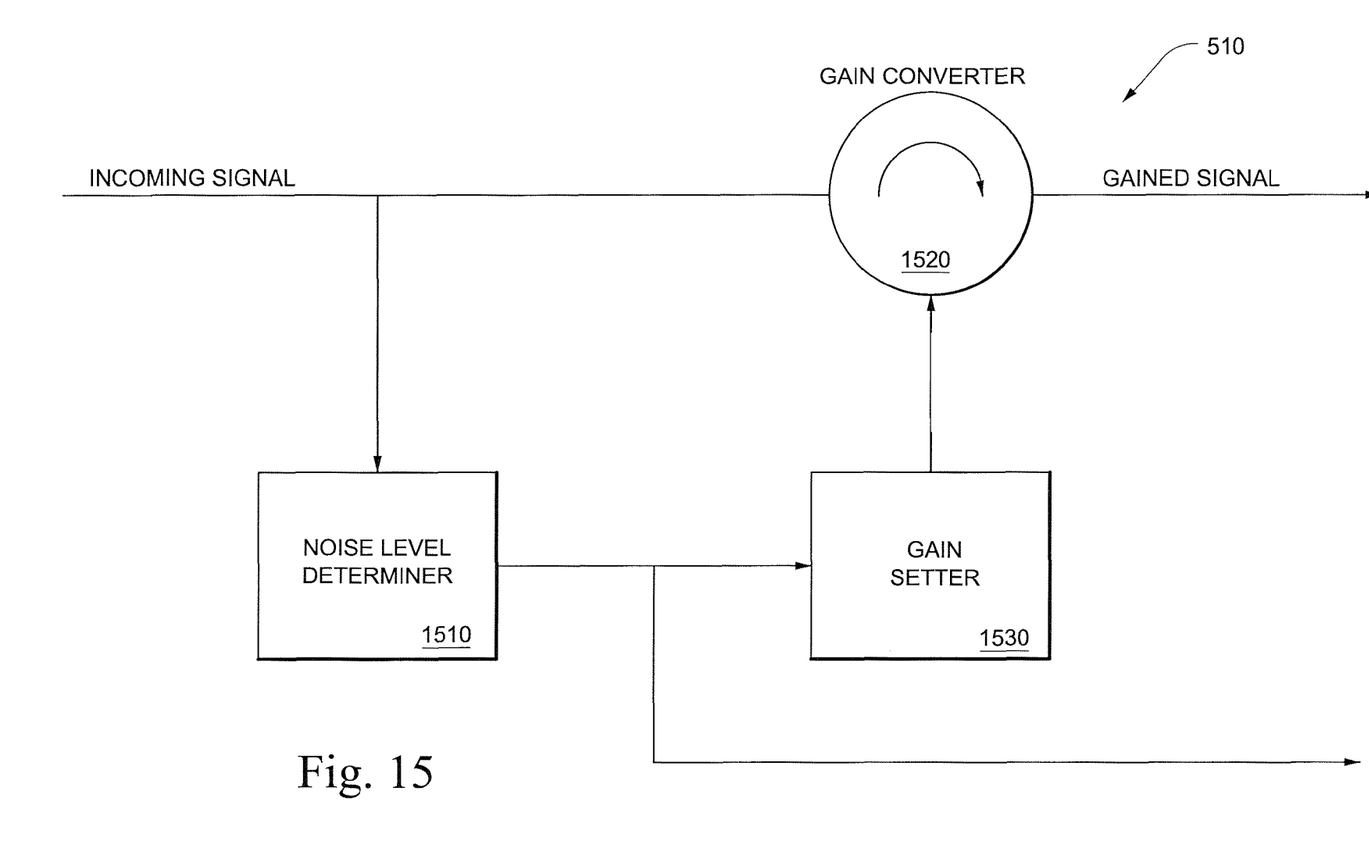
FIG. 15 an embodiment of an automatic gain controller.

One or more of the discussed methods may be performed by the AGC 510 in FIG. 5. FIG. 15 illustrates one embodiment of the AGC 510. The AGC includes a gain converter 1520, a noise level determiner 1510, and a gain setter 1530 all operatively connected to each other. The gain converter 1520 is configured to convert the incoming signal into a gained signal based on a gain set by the gain setter. The gained signal is provided to an ADC such as the ADC 520 in FIG. 5. The noise level determiner 1510 is configured to determine the noise level of the incoming signal based on a incoming signal received at the base station. The noise level is determined based on the incoming signal received during a non-uplink time period. In general, the gain converter 1520, the noise level determiner 1510, and the gain setter 1530 are configured to implement the methods as described above.

Figure 16:
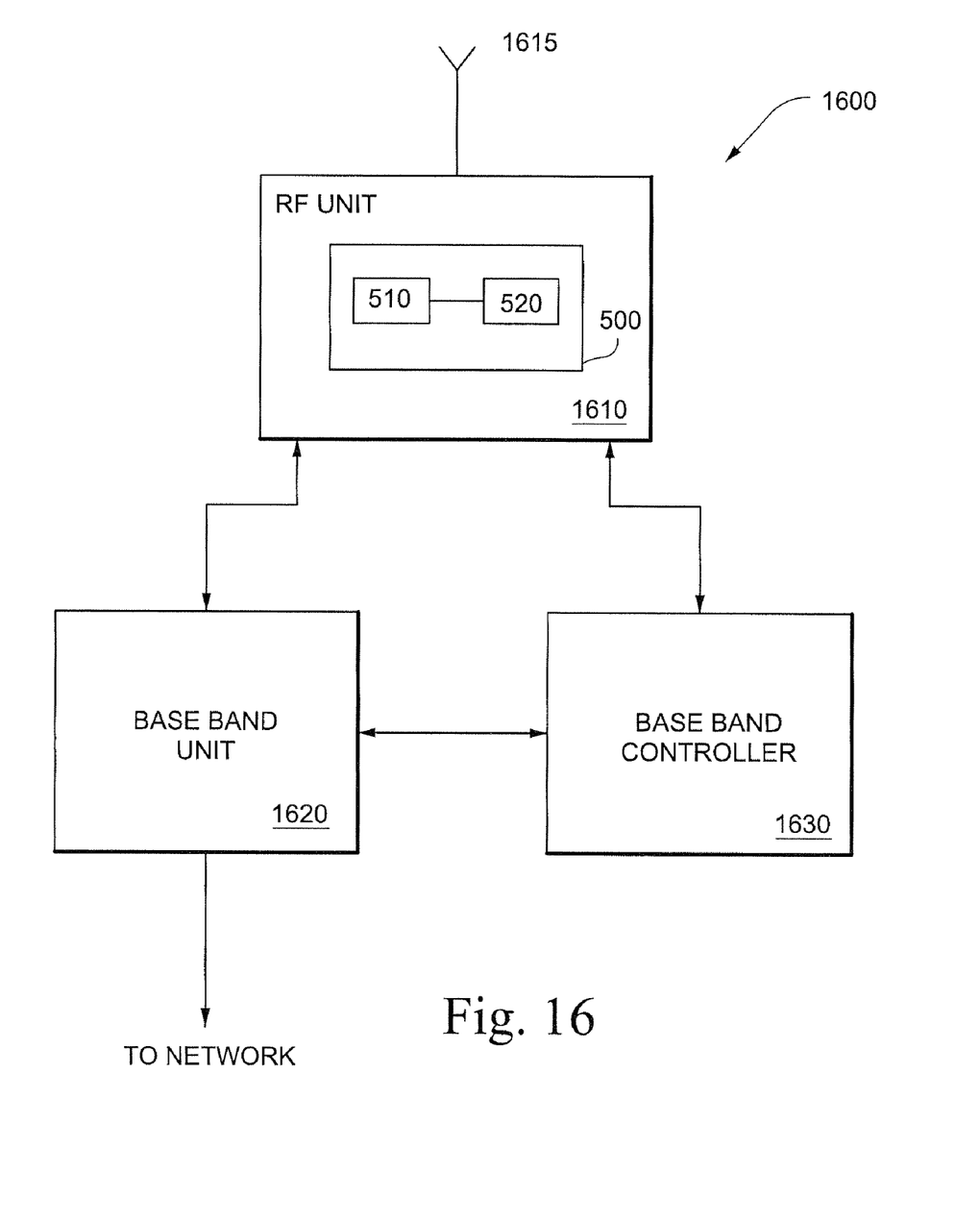
FIG. 16 illustrates an embodiment of a base station configured to operate in the TDD mode.

The gain control apparatus 500 (FIG. 5) including the ADC 520 and the AGC 510 (FIG. 15) can be incorporated into a base station 1600 configured to operate in the TDD mode as illustrated in FIG. 16. The base station 1600 includes a radio frequency (RF) unit 1610, a base band unit 1620, and a base station controller 1630 operatively coupled to each other. The RF unit 1610 is configured to convert wireless signals received from one or more mobile terminals to corresponding digital signals and also to convert digital signals destined to the one or more mobile terminals to corresponding wireless signals. The base band unit is configured to receive the digital signals from the RF unit 1610 and to provide the digital signals destined to the one or more mobile terminals to the RF unit 1610). The base station controller 1630 is configured to control operations of the RF unit 1610 and the base band unit 1620. In this example embodiment, the RF unit 1610 includes the ADC 520 and the AGC 510 (see FIGS. 5 and 15).

In addition to setting the gain for future UL time slots, the information regarding the noise level can be used to benefit other operations. For example, the base station noise floor can be informed to all UEs via broadcast control channel (BCCH) in particular cell carrier. This can aid the mobile terminals to decide on an appropriate power level when transmitting an access preamble or other communication request.

The noise level information can also be used to enhance the service provided to the mobile terminals. Based on the noise level, the base station can control the power level of the mobile terminals such as through a TPC (transmit power control) data. If the noise level is high, then the base station can instruct the mobile terminals to increase power to compensate. If the noise level is low, then the mobile terminals can decrease power to conserve battery power and cause less noise in the network for other base stations.

The features of the one or more disclosed examples may be implemented as a program stored in a computer readable medium. The computer readable medium can include, but is not limited to, CDs, DVDs, magnetic hard disks, RAMs, and ROMs.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method step in the present disclosure is intended to be dedicated to the public.

What is claimed is:

1. A method for controlling a gain of an automatic gain controller operating in a time division duplex mode, the method comprising:

measuring an incoming signal; received at a base station; during a non-uplink time period in which none of one or more mobile terminals in communication with the base station are allowed to provide uplink communication;

determining a noise level based on the received incoming signal; and setting the gain of the automatic gain controller based on the noise level and uplink signals expected in a future uplink time slot from the one or more mobile terminals, wherein the gain of the automatic gain controller is for use in the future uplink time slot to provide communications from the one or more mobile terminals to the base station.

2. The method of claim 1, wherein the non-uplink time period is a DwPTS period.

3. The method of claim 1, wherein the act of determining the noise level comprises determining a power level of the incoming signal received during the non-uplink time period as the noise level.

4. The method of claim 1, wherein the act of determining the noise level comprises:
determining a base station's contribution to the received incoming signal; and
factoring out the base station's contribution from the received incoming signal.

5. The method of claim 1, wherein the non-uplink time period is a gap period in which no uplink and no downlink communication are allowed to take place.

6. The method of claim 5, wherein the act of determining the noise level comprises determining a power level of the incoming signal received during the non-uplink time period as the noise level.

7. The method of claim 5, wherein the act of measuring the incoming signal comprises:
waiting for a measuring time to arrive after a transmit stop time, wherein the transmit stop time is when the base station stops transmitting; and
measuring the incoming signal at the base station when the measuring time arrives.

8. The method of claim 7, wherein a duration of time between the transmit stop time and the measuring time is sufficient for the transmission from the base station to reach a negligible quiescence level such that the power level of the incoming signal measured at the measuring time is determined to be the noise level.

9. The method of claim 7, wherein the act of determining the noise level based on the incoming signal comprises:
determining a base station's contribution to the received incoming signal; and
factoring out the base station's contribution from the received incoming signal.

10. The method of claim 5, wherein the gap period is a Guard Period.

11. An automatic gain controller for controlling a gain of an incoming signal when operating in a time division duplex mode, comprising:
a noise level determiner configured to determine a noise level of the incoming signal received at a base station during a non-uplink time period in which none of one or more mobile terminals in communication with the base station are allowed to provide uplink communication; and
a gain setter operatively connected to the noise level determiner and configured to set a gain of a gain converter based on the noise level determined by the noise level determiner and uplink signals expected in a, future uplink time slot from the one or more mobile terminals, wherein the gain for the gain converter is set for use in the future uplink time slot to provide communications from the one or more mobile terminals to the base station.

12. The automatic gain controller of claim 11, wherein the non-uplink time period is a DwPTS period.

13. The automatic gain controller of claim 11, wherein the noise level determiner is configured to determine a power level of the incoming signal received during the non-uplink time period as the noise level.

14. The automatic gain controller of claim 11, wherein the noise level determiner is configured to:
determine a base station's contribution to the received incoming signal; and
factor out the base station's contribution from the received incoming signal.

15. The automatic gain controller of claim 11, wherein the non-uplink time period is a gap period in which no uplink and no downlink communication are allowed to take place.

16. The automatic gain controller of claim 15, wherein the noise level determiner is configured to determine a power level of the incoming signal received during the non-uplink time period as the noise level.

17. The automatic gain controller of claim 15, wherein the noise level determiner is configured to:
wait for a measuring time to arrive after a transmit stop time, wherein the transmit stop time is when the base station stops transmitting, and
measure the incoming signal when the measuring time arrives.

18. The automatic gain controller of claim 17, wherein a duration of time between the transmit stop time and the measuring time is sufficient for the transmission from the base station to reach a negligible quiescence level such that the power level of the incoming signal measured at the measuring time is determined to be the noise level.

19. The automatic gain controller of claim 17, wherein the noise level determiner is configured to:
determine a base station's contribution to the received incoming signal from the base station, and
factor out the base station's contribution from the received incoming signal to determine the noise level.

20. The automatic gain controller of claim 15, wherein the gap period is a Guard Period.

21. A base station for providing time division duplex service to one or more mobile terminals, comprising:
a radio frequency (RF) unit configured to convert wireless signals received from the one or more mobile terminals to corresponding digital signals and to convert digital signals destined to the one or more mobile terminals to corresponding wireless signals;
a base band unit operatively coupled to the RF unit and configured to receive the digital signals from the RF unit and to provide the digital signals destined to the one or more mobile terminals to the RF unit; and
a base station controller configured to control operations of the RF unit and the base band unit,
wherein the RF unit comprises an automatic gain control apparatus which includes the automatic gain controller as recited in claim 13 and an analog-to-digital converter configured to convert the gained signal from the automatic gain controller into the digital signals for the base band unit.

22. A non-transitory computer readable medium storing therein a program to cause a computer or processor to set a gain of an automatic gain controller of a base station when the base station operates in a time division duplex mode, the set gain being for use in a future uplink time slot to provide communications from one or more mobile terminals to the base station, wherein the program comprises instructions to perform acts of:

determining a noise level of an incoming signal received at the base station during a time period in which no uplink communication from the mobile terminals to base station is allowed to take place; and     setting the gain of the automatic gain controller based on the noise level and uplink signals expected in the future uplink time slot from the one or more mobile terminals.

23. The non-transitory computer readable medium of claim 22, wherein the act of determining the noise level comprises determining a power level of the incoming signal received during the time period as the noise level.

24. The non-transitory computer readable medium of claim 22, wherein the act of determining the noise level comprises:

determining a base station's contribution to the received incoming signal; and     factoring out the base station's contribution from the received incoming signal.

25. The non-transitory computer readable medium of claim 22, wherein the time period is also a period in which no downlink communication takes place from the base station to the one or more mobile terminals.

26. The non-transitory computer readable medium of claim 25, wherein the act of determining the noise level comprises determining a power level of the incoming signal received during the time period as the noise level.

27. The non-transitory computer readable medium of claim 26, wherein the act of determining the power of the incoming signal received during the time period comprises:

waiting a predetermined amount of time after the base station discontinues transmission; and     determining the power level of the incoming signal received after the predetermined amount of time has passed as the noise level,     wherein the predetermined amount of time is sufficiently long enough the base station's transmission to a reach quiescence level.

28. The non-transitory computer readable medium of claim 25, wherein the act of determining the noise level comprises:

determining a base station's contribution to the received incoming signal; and     factoring out the base station's contribution from the received incoming signal.

29. The non-transitory computer readable medium of claim 28, wherein the act of determining the base station's contribution to the received incoming signal comprises waiting a predetermined amount of time after the base station discontinues transmission, and calculating the base station's contribution at the predetermined amount of time; and     wherein the act of factoring out the base station's contribution comprises factoring out the calculated contribution from a power level of the incoming signal received after the predetermined amount of time has passed.

* * * * *

UNITED STATES PATENT AND TRADEMARK OFFICE
CERTIFICATE OF CORRECTION

| | | |
|---|---|---|
| PATENT NO. | : 8,144,634 B2 | Page 1 of 1 |
| APPLICATION NO. | : 11/948009 | |
| DATED | : March 27, 2012 | |
| INVENTOR(S) | : Nejatian | |

It is certified that error appears in the above-identified patent and that said Letters Patent is hereby corrected as shown below:

In Column 3, Line 37, delete "TX power" and insert -- Tx power --, therefor.

In Column 6, Line 20, delete "TX" and insert -- Tx --, therefor.

In Column 9, Line 1, in Claim 1, delete "signal; received at a base station;" and insert -- signal received at a base station --, therefor.

In Column 9, Line 66, in Claim 11, delete "a," and insert -- a --, therefor.

In Column 12, Line 7, in Claim 27, delete "to a reach" and insert -- to reach a --, therefor.

Signed and Sealed this
Third Day of July, 2012

David J. Kappos
*Director of the United States Patent and Trademark Office*